United States Patent
Wyatt et al.

(10) Patent No.: US 9,135,675 B2
(45) Date of Patent: Sep. 15, 2015

(54) MULTIPLE GRAPHICS PROCESSING UNIT DISPLAY SYNCHRONIZATION SYSTEM AND METHOD

(75) Inventors: David Wyatt, San Jose, CA (US); Manish Modi, San Jose, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 612 days.

(21) Appl. No.: 12/484,954

(22) Filed: Jun. 15, 2009

(65) Prior Publication Data
US 2010/0315427 A1  Dec. 16, 2010

(51) Int. Cl.
  *G06F 15/80* (2006.01)
  *G06F 15/00* (2006.01)
  *G06F 15/16* (2006.01)
  *G06T 3/00* (2006.01)
  *G06F 3/14* (2006.01)
  *G09G 5/12* (2006.01)

(52) U.S. Cl.
  CPC ... *G06T 3/00* (2013.01); *G06F 3/14* (2013.01); *G09G 5/12* (2013.01); *G09G 2360/06* (2013.01); *G09G 2370/14* (2013.01); *G09G 2370/20* (2013.01)

(58) Field of Classification Search
  CPC . G09G 5/12; G09G 2360/06; G09G 2352/00; G09G 5/363
  USPC .......................................... 345/501–503, 505
  See application file for complete search history.

(56) References Cited

U.S. PATENT DOCUMENTS

| | | | |
|---|---|---|---|
| 4,145,685 A | * | 3/1979 | Farina ............................. 345/82 |
| 4,603,400 A | | 7/1986 | Daniels |
| 4,955,066 A | | 9/1990 | Notenboom |
| 5,016,001 A | | 5/1991 | Minagawa et al. |
| 5,321,419 A | | 6/1994 | Katakura et al. |
| 5,321,510 A | | 6/1994 | Childers et al. |
| 5,321,811 A | | 6/1994 | Kato et al. |

(Continued)

FOREIGN PATENT DOCUMENTS

WO  2005026918  3/2005

OTHER PUBLICATIONS

"Epson; EMP Monitor V4, 10 Operation Guide", by Seiko Epson Corp., 2006 http://support.epson.ru/products/manuals/100396/Manual/EMPMonitor.pdf.

(Continued)

*Primary Examiner* — Joni Richer (57) ABSTRACT

Systems and methods for utilizing multiple graphics processing units for controlling presentations on a display are presented. In one embodiment, a dual graphics processing system includes a first graphics processing unit for processing graphics information; a second graphics processing unit for processing graphics information; a component for synchronizing transmission of display component information from the first graphics processing unit and the second graphics processing unit and a component for controlling switching between said first graphics processing unit and said second graphics processing unit. In one embodiment, the component for synchronizing transmission of display component information adjusts (e.g., delays, speeds up, etc.) the occurrence or duration of a corresponding graphics presentation characteristic (e.g., end of frame, end of line, vertical blanking period, horizontal blanking period, etc.) in signals from multiple graphics processing units.

20 Claims, 8 Drawing Sheets

(56) References Cited

U.S. PATENT DOCUMENTS

| | | | |
|---|---|---|---|
| 5,371,847 A | 12/1994 | Hargrove | |
| 5,461,679 A | 10/1995 | Normile et al. | |
| 5,517,612 A | 5/1996 | Dwin et al. | |
| 5,552,802 A | 9/1996 | Nonoshita et al. | |
| 5,687,334 A | 11/1997 | Davis et al. | |
| 5,712,995 A | 1/1998 | Cohn | |
| 5,768,164 A | 6/1998 | Hollon, Jr. | |
| 5,781,199 A | 7/1998 | Oniki et al. | |
| 5,841,435 A | 11/1998 | Dauerer et al. | |
| 5,878,264 A | 3/1999 | Ebrahim | |
| 5,900,913 A | 5/1999 | Tults | |
| 5,917,502 A | 6/1999 | Kirkland et al. | |
| 5,923,307 A | 7/1999 | Hogle, IV | |
| 5,963,200 A * | 10/1999 | Deering et al. | 345/213 |
| 5,978,042 A | 11/1999 | Vaske et al. | |
| 6,002,411 A | 12/1999 | Dye | |
| 6,008,809 A | 12/1999 | Brooks | |
| 6,018,340 A | 1/2000 | Butler et al. | |
| 6,025,853 A | 2/2000 | Baldwin | |
| 6,075,531 A | 6/2000 | DeStefano | |
| 6,078,339 A | 6/2000 | Meinerth et al. | |
| 6,118,462 A | 9/2000 | Margulis | |
| 6,175,373 B1 * | 1/2001 | Johnson | 345/537 |
| 6,191,758 B1 | 2/2001 | Lee | |
| 6,208,273 B1 | 3/2001 | Dye et al. | |
| 6,226,237 B1 | 5/2001 | Chan et al. | |
| 6,259,460 B1 | 7/2001 | Gossett et al. | |
| 6,337,747 B1 | 1/2002 | Rosenthal | |
| 6,359,624 B1 | 3/2002 | Kunimatsu | |
| 6,388,671 B1 | 5/2002 | Yoshizawa et al. | |
| 6,449,017 B1 * | 9/2002 | Chen | 348/539 |
| 6,473,086 B1 | 10/2002 | Morein et al. | |
| 6,480,198 B2 | 11/2002 | Kang | |
| 6,483,502 B2 | 11/2002 | Fujiwara | |
| 6,498,721 B1 | 12/2002 | Kim | |
| 6,557,065 B1 * | 4/2003 | Peleg et al. | 710/300 |
| 6,600,500 B1 | 7/2003 | Yamamoto | |
| 6,606,127 B1 * | 8/2003 | Fang et al. | 348/500 |
| 6,628,243 B1 | 9/2003 | Lyons et al. | |
| 6,630,943 B1 | 10/2003 | Nason et al. | |
| 6,654,826 B1 | 11/2003 | Cho et al. | |
| 6,657,632 B2 | 12/2003 | Emmot et al. | |
| 6,724,403 B1 | 4/2004 | Santoro et al. | |
| 6,753,878 B1 | 6/2004 | Heirich et al. | |
| 6,774,912 B1 | 8/2004 | Ahmed et al. | |
| 6,784,855 B2 | 8/2004 | Matthews et al. | |
| 6,816,977 B2 | 11/2004 | Brakmo et al. | |
| 6,832,269 B2 | 12/2004 | Huang et al. | |
| 6,832,355 B1 | 12/2004 | Duperrouzel et al. | |
| 6,956,542 B2 | 10/2005 | Okuley et al. | |
| 7,007,070 B1 | 2/2006 | Hickman | |
| 7,010,755 B2 | 3/2006 | Anderson et al. | |
| 7,030,837 B1 | 4/2006 | Vong et al. | |
| 7,034,776 B1 | 4/2006 | Love | |
| 7,119,808 B2 * | 10/2006 | Gonzalez et al. | 345/502 |
| 7,124,360 B1 | 10/2006 | Drenttel et al. | |
| 7,129,909 B1 | 10/2006 | Dong et al. | |
| 7,212,174 B2 | 5/2007 | Johnston et al. | |
| 7,269,797 B1 | 9/2007 | Bertocci et al. | |
| 7,359,998 B2 | 4/2008 | Chan et al. | |
| 7,383,412 B1 | 6/2008 | Diard | |
| 7,450,084 B2 | 11/2008 | Fuller et al. | |
| 7,486,279 B2 | 2/2009 | Wong et al. | |
| 7,509,444 B2 | 3/2009 | Chiu et al. | |
| 7,522,167 B1 | 4/2009 | Diard et al. | |
| 7,552,391 B2 | 6/2009 | Evans et al. | |
| 7,558,884 B2 | 7/2009 | Fuller et al. | |
| 7,612,783 B2 | 11/2009 | Koduri et al. | |
| 8,176,155 B2 | 5/2012 | Yang et al. | |
| 8,766,989 B2 | 7/2014 | Wyatt et al. | |
| 2001/0028366 A1 | 10/2001 | Ohki et al. | |
| 2002/0087225 A1 | 7/2002 | Howard | |
| 2002/0128288 A1 | 9/2002 | Kyle et al. | |
| 2002/0129288 A1 | 9/2002 | Loh et al. | |
| 2002/0140627 A1 | 10/2002 | Ohki et al. | |
| 2002/0163513 A1 | 11/2002 | Tsuji | |
| 2002/0182980 A1 | 12/2002 | Van Rompay | |
| 2002/0186257 A1 | 12/2002 | Cadiz et al. | |
| 2003/0016205 A1 | 1/2003 | Kawabata et al. | |
| 2003/0025689 A1 | 2/2003 | Kim | |
| 2003/0041206 A1 | 2/2003 | Dickie | |
| 2003/0065934 A1 | 4/2003 | Angelo et al. | |
| 2003/0084181 A1 | 5/2003 | Wilt | |
| 2003/0088800 A1 | 5/2003 | Cai | |
| 2003/0090508 A1 | 5/2003 | Keohane et al. | |
| 2003/0122836 A1 | 7/2003 | Doyle et al. | |
| 2003/0126335 A1 | 7/2003 | Silvester | |
| 2003/0188144 A1 | 10/2003 | Du et al. | |
| 2003/0189597 A1 | 10/2003 | Anderson et al. | |
| 2003/0195950 A1 | 10/2003 | Huang et al. | |
| 2003/0197739 A1 | 10/2003 | Bauer | |
| 2003/0200435 A1 | 10/2003 | England et al. | |
| 2003/0222876 A1 | 12/2003 | Giemborek et al. | |
| 2004/0001069 A1 | 1/2004 | Snyder et al. | |
| 2004/0019724 A1 | 1/2004 | Singleton, Jr. et al. | |
| 2004/0027315 A1 | 2/2004 | Senda et al. | |
| 2004/0080482 A1 | 4/2004 | Magendanz et al. | |
| 2004/0085328 A1 | 5/2004 | Maruyama et al. | |
| 2004/0184523 A1 | 9/2004 | Dawson et al. | |
| 2004/0222978 A1 | 11/2004 | Bear et al. | |
| 2004/0224638 A1 | 11/2004 | Fadell et al. | |
| 2004/0225901 A1 | 11/2004 | Bear et al. | |
| 2004/0225907 A1 | 11/2004 | Jain et al. | |
| 2004/0235532 A1 | 11/2004 | Matthews et al. | |
| 2004/0268004 A1 | 12/2004 | Oakley | |
| 2005/0012749 A1 | 1/2005 | Gonzalez et al. | |
| 2005/0025071 A1 | 2/2005 | Miyake et al. | |
| 2005/0052446 A1 | 3/2005 | Plut | |
| 2005/0059346 A1 | 3/2005 | Gupta et al. | |
| 2005/0064911 A1 | 3/2005 | Chen et al. | |
| 2005/0066209 A1 | 3/2005 | Kee et al. | |
| 2005/0073515 A1 | 4/2005 | Kee et al. | |
| 2005/0076088 A1 | 4/2005 | Kee et al. | |
| 2005/0076256 A1 | 4/2005 | Fleck et al. | |
| 2005/0097506 A1 | 5/2005 | Heumesser | |
| 2005/0140566 A1 | 6/2005 | Kim et al. | |
| 2005/0182980 A1 | 8/2005 | Sutardja | |
| 2005/0240538 A1 | 10/2005 | Ranganathan | |
| 2005/0262302 A1 | 11/2005 | Fuller et al. | |
| 2006/0001595 A1 | 1/2006 | Aoki | |
| 2006/0007051 A1 | 1/2006 | Bear et al. | |
| 2006/0010261 A1 | 1/2006 | Bonola et al. | |
| 2006/0085760 A1 | 4/2006 | Anderson et al. | |
| 2006/0095617 A1 | 5/2006 | Hung | |
| 2006/0119537 A1 | 6/2006 | Vong et al. | |
| 2006/0119538 A1 | 6/2006 | Vong et al. | |
| 2006/0119602 A1 | 6/2006 | Fisher et al. | |
| 2006/0125784 A1 | 6/2006 | Jang et al. | |
| 2006/0129855 A1 | 6/2006 | Rhoten et al. | |
| 2006/0130075 A1 | 6/2006 | Rhoten et al. | |
| 2006/0150230 A1 | 7/2006 | Chung et al. | |
| 2006/0164324 A1 | 7/2006 | Polivy et al. | |
| 2006/0200751 A1 | 9/2006 | Underwood et al. | |
| 2006/0232494 A1 | 10/2006 | Lund et al. | |
| 2006/0250320 A1 | 11/2006 | Fuller et al. | |
| 2006/0267857 A1 | 11/2006 | Zhang et al. | |
| 2006/0267987 A1 | 11/2006 | Litchmanov | |
| 2006/0267992 A1 | 11/2006 | Kelley et al. | |
| 2006/0282855 A1 | 12/2006 | Margulis | |
| 2007/0046562 A1 | 3/2007 | Polivy et al. | |
| 2007/0052615 A1 | 3/2007 | Van Dongen et al. | |
| 2007/0067655 A1 | 3/2007 | Shuster | |
| 2007/0079030 A1 | 4/2007 | Okuley et al. | |
| 2007/0083785 A1 | 4/2007 | Sutardja | |
| 2007/0091098 A1 | 4/2007 | Zhang et al. | |
| 2007/0103383 A1 | 5/2007 | Sposato et al. | |
| 2007/0129990 A1 | 6/2007 | Tzruya et al. | |
| 2007/0153007 A1 | 7/2007 | Booth et al. | |
| 2007/0195007 A1 | 8/2007 | Bear et al. | |
| 2007/0273699 A1 | 11/2007 | Sasaki et al. | |
| 2008/0130543 A1 | 6/2008 | Singh et al. | |
| 2008/0155478 A1 | 6/2008 | Stross | |
| 2008/0158233 A1 | 7/2008 | Shah et al. | |
| 2008/0172626 A1 | 7/2008 | Wu | |

(56) References Cited

U.S. PATENT DOCUMENTS

| | | |
|---|---|---|
| 2008/0297433 A1 | 12/2008 | Heller et al. |
| 2008/0320321 A1 | 12/2008 | Sutardja |
| 2009/0021450 A1 | 1/2009 | Heller et al. |
| 2009/0031329 A1 | 1/2009 | Kim |
| 2009/0059496 A1 | 3/2009 | Lee |
| 2009/0109159 A1 | 4/2009 | Tsai |
| 2009/0153540 A1 | 6/2009 | Blinzer et al. |
| 2009/0160865 A1 | 6/2009 | Grossman |
| 2009/0172450 A1 | 7/2009 | Wong et al. |
| 2009/0193243 A1 | 7/2009 | Ely |
| 2010/0010653 A1 | 1/2010 | Bear et al. |
| 2010/0033433 A1 | 2/2010 | Utz et al. |
| 2010/0033916 A1 | 2/2010 | Douglas et al. |
| 2010/0085280 A1 | 4/2010 | Lambert et al. |
| 2011/0102446 A1 | 5/2011 | Oterhals et al. |
| 2011/0141133 A1 | 6/2011 | Sankuratri et al. |
| 2012/0108330 A1 | 5/2012 | Dietrich, Jr. et al. |
| 2012/0162238 A1 | 6/2012 | Fleck et al. |
| 2012/0268480 A1 | 10/2012 | Cooksey et al. |
| 2014/0168229 A1 | 6/2014 | Ungureanu et al. |
| 2014/0184611 A1 | 7/2014 | Wyatt et al. |
| 2014/0184629 A1 | 7/2014 | Wyatt et al. |

OTHER PUBLICATIONS

"Virtual Network Computing", http://en.wikipedia.org/wiki/Vnc, Downloaded Circa: Dec. 18, 2008, pp. 1-4.

Andrew Fuller; "Auxiliary Display Platform in Longhorn"; Microsoft Corporation; The Microsoft Hardware Engineering Conference Apr. 25-27, 2005; slides 1-29.

McFedries, ebook, titled "Complete Idiot's Guide to Windows XP", published Oct. 3, 2001, pp. 1-7.

PCWorld.com, "Microsoft Pitches Display for Laptop Lids" dated Feb. 10, 2005, pp. 1-2, downloaded from the Internet on Mar. 8, 2006 from http://www.pcworld.com/resources/article/aid/119644.asp.

Vulcan, Inc., "Product Features: Size and performance", p. 1; downloaded from the internet on Sep. 20, 2005 from http://www.flipstartpc.com/aboutproduct_features_sizeandpower.asp.

Vulcan, Inc., "Product Features:LID Module", p. 1, downloaded from the Internet on Sep. 19, 2005 from http://www.flipstartpc.com/aboutproduct_features_lidmodule.asp.

Vulcan, Inc., "Software FAQ", p. 1, downloaded from the internet on Sep. 20, 2005 from http://www.flipstartpc.com/faq_software.asp.

"System Management Bus (SMBus) Specification," Version 2.0, Aug. 3, 2000; pp. 1-59.

Handtops.com, "FlipStart PC in Detail" pp. 1-4, downloaded from the internet o Sep. 20, 2005 from http://www.handtops.com/show/news/5.

Microsoft Corporation, "Microsoft Windows Hardware Showcase", dated Apr. 28, 2005; pp. 1-5; downloaded from the internet on Sep. 15, 2005, from http://www.microsoft.com/whdc/winhec/hwshowcase05.mspx.

Paul Thurrot's SuperSite for Windows, "WinHEC 2004 Longhorn Prototypes Gallery", dated May 10, 2004, pp. 1-4, downloaded from the internet on Sep. 15, 2005 from http://www.sinwupersite.com/showcase.loghom_winhc_proto.asp.

"The Java Tutorial: How to Use Combo Boxes", Archived Mar. 5, 2006 by archive.org, Downloaded Jun. 30, 2011, http://web.archive.org/web/20050305000852/http://www-mips.unice.fr/Doc/Java/Tutorial/uiswing/components/combobox.html.

Vulcan Inc., "Connectivity FAQ", p. 1, downloaded from the internet on Sep. 20, 2005 from http://www.flipstartpc.com/faq_connectivity.asp.

"Usage: NVIDIA GeForce 6800—PCIe x16", Dell, archived Jan. 15, 2006 by archive.org, Downloaded Jun. 29, 2011, http://web.archive.org/web/20060115050119/http://support.dell.com/support/edocs/video/P82192/en/usage.html.

"Graphics: Intel® 82852182855 Graphics Controller Family", Intel, Archived Nov. 2, 2006 by archive.org, Downloaded Jun. 30, 2011, http://web.archive.org/web/20061103045644/http://www.intel.com/support/graphics/intel852gm/sb/CS-009064.html.

Texas Instruments, "TMS320VC5501/5502 DSP Direct Memory Access (DMA) Controller Reference Guide", Sections 1, 2, 4, 11, and 12; Literature No. SPRU613G, Mar. 2005.

\* cited by examiner

```
┌─────────────────────────────────────────────────────────┐
│ Graphics processing is performed on a first graphics    │
│ processing unit and results of the graphics processing  │
│ from the first graphics processing unit are forwarded   │
│ to a display                                            │
│                        510                              │
└─────────────────────────────────────────────────────────┘
                            │
┌─────────────────────────────────────────────────────────┐
│ Graphics processing is performed on a second graphics   │
│                    processing unit                      │
│                        520                              │
└─────────────────────────────────────────────────────────┘
                            │
┌─────────────────────────────────────────────────────────┐
│ A synchronizing process is performed in which graphics  │
│ signals from the first graphics processing unit are     │
│ synchronized to graphics signals from the second        │
│              graphics processing unit                   │
│                        530                              │
└─────────────────────────────────────────────────────────┘
                            │
┌─────────────────────────────────────────────────────────┐
│ A graphics processing unit change over process is       │
│ performed in which results of the graphics processing   │
│ from the second graphics processing unit are forwarded  │
│ to the display instead of the results of the graphics   │
│ processing from the first graphics                      │
│                        540                              │
└─────────────────────────────────────────────────────────┘
```

A difference in the timing of a corresponding graphics presentation characteristic is determined
610

At least one signal from a least one of the first processor and the second processor is adjusted to synchronize the occurrence of a corresponding graphics presentation characteristic
620

An indication to initiate a switch between graphics processors is received.
710

The vertical blank interrupt is hooked on the first GPU and the second GPU
720

The temporal misalignment is quantified
730

A timing factor (e.g., the horizontal blanking interval, vertical blanking interval, etc.) on one of the processors is adjusted (e.g., delayed, speeded up, etc.)
740

A vertical blank indication is received and a corresponding absolute time indication is tracked
750

A determination is made that the signals from both GPU's align
760

A switch is made between the processors
770

FIGURE 7

MULTIPLE GRAPHICS PROCESSING UNIT DISPLAY SYNCHRONIZATION SYSTEM AND METHOD

FIELD OF THE INVENTION

The present invention relates to the field of displaying presentations associated with graphics processing units.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Frequently, these activities often involve the presentation of various graphics information on a display.

Graphics applications associated with the display presentations can have different characteristics and features. For example, graphics applications can have different processing requirements, different quality features, involve different levels of complexity, and so on. A system may include multiple graphics processing units and the graphics processing units can also have different processing capabilities and characteristics. In addition, control software and hardware for each processor may be entirely different (e.g., processors manufactured by different vendors, etc.) and not able to be controlled identically. Furthermore, displays typically can only handle input from one graphics processing unit at a time and often have particular interface requirements. For example, if signaling is not performed correctly damage to the panel may result, or the user may observe disturbing visual artifacts, or the panel controller may force a failsafe shutdown.

Ensuring the timing requirements are met when changing between active graphics processing units can be complicated and complex. Before a transition occurs one GPU is driving the LVDS and there is an extremely small chance that signals from the GPU are aligned with another GPU, creating flickering and substantial delays while a Panels Timing Controller (TCON) resynchronizes with the second source. For example, when a switch occurs one GPU may be at the end of a raster scan while the other is at the beginning. Displays typically have panel power sequencing specifications that indicate signal activation timing requirements. For example, the standards panel working group (SPWG) indicates general mechanical and interface specifications (e.g., SPWG spec, http://www.spwg.org) for displays used in note book computers. Detrimental impacts to images and the display itself can occur if timing requirements are not adhered to. In addition, if the panel power sequencing specifications are not adhered to the TCON may take multiple frames until it re-acquires the vertical sync such as indicated by the assertion of VSync signal, or the de-assertion of Display Enable, whereupon it can begin to re-synchronize to the second GPU's signal. If the mis-sync lasts too long then the TCON can misinterpret the condition as a loss of timing and then enter Fail-Safe mode wherein the LCD is safely shutdown and the panel must be powered-off and on before it will re-enable displays.

SUMMARY

Systems and methods for utilizing multiple graphics processing units for controlling presentations on a display are presented. In one embodiment, a dual graphics processing system includes a first graphics processing unit for processing graphics information; a second graphics processing unit for processing graphics information; a component for synchronizing transmission of display component information from the first graphics processing unit and the second graphics processing unit and a component for controlling switching between said first graphics processing unit and said second graphics processing unit. In one embodiment, the component for synchronizing transmission of display component information adjusts (e.g., delays, speeds up, etc.) the occurrence or duration of a corresponding graphics presentation characteristic (e.g., end of frame, end of line, vertical blanking period, horizontal blanking period, etc.) in signals from multiple graphics processing units.

DESCRIPTION OF THE DRAWINGS

The accompanying drawings, which are incorporated in and form a part of this specification, are included for exemplary illustration of the principles of the present invention and not intended to limit the present invention to the particular implementations illustrated therein. The drawings are not to scale unless otherwise specifically indicated.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Portions of the detailed description that follows are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in modulated data signals such as carrier waves or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc, that perform particular tasks or implement particular abstract data types. Typically the functionality of the program modules may be combined or distributed as desired in various embodiments.

The present invention facilitates efficient and effective utilization of multiple graphics processing units or hybrid graphics processing system. In one embodiment, a dual graphics processing system includes a first graphics processing unit for processing graphics information, a second graphics processing unit for processing graphics information, a component for synchronizing transmission of display component information from the first graphics processing unit and the second graphics processing unit, and a component for controlling switching between the first graphics processing unit and the second graphics processing unit. In one embodiment, blanking intervals are adjusted to facilitate synchronization and simulate a "genlock" without use of conventional Genlock hardware. For example, adjustable-timing components of one or more GPUs can be leveraged to adjust (e.g., slide, etc.) the timing alignment of one pixel source to match another pixel source, and then a transition from one source to the other can be made with minimal or no transition artifacts and the independent timing of the pixel sources can be restored after the transition. In an exemplary implementation, the first graphics processing unit is an integrated graphics processing unit and the second graphics processing unit is a discreet graphics processing unit.

Figure 1A:
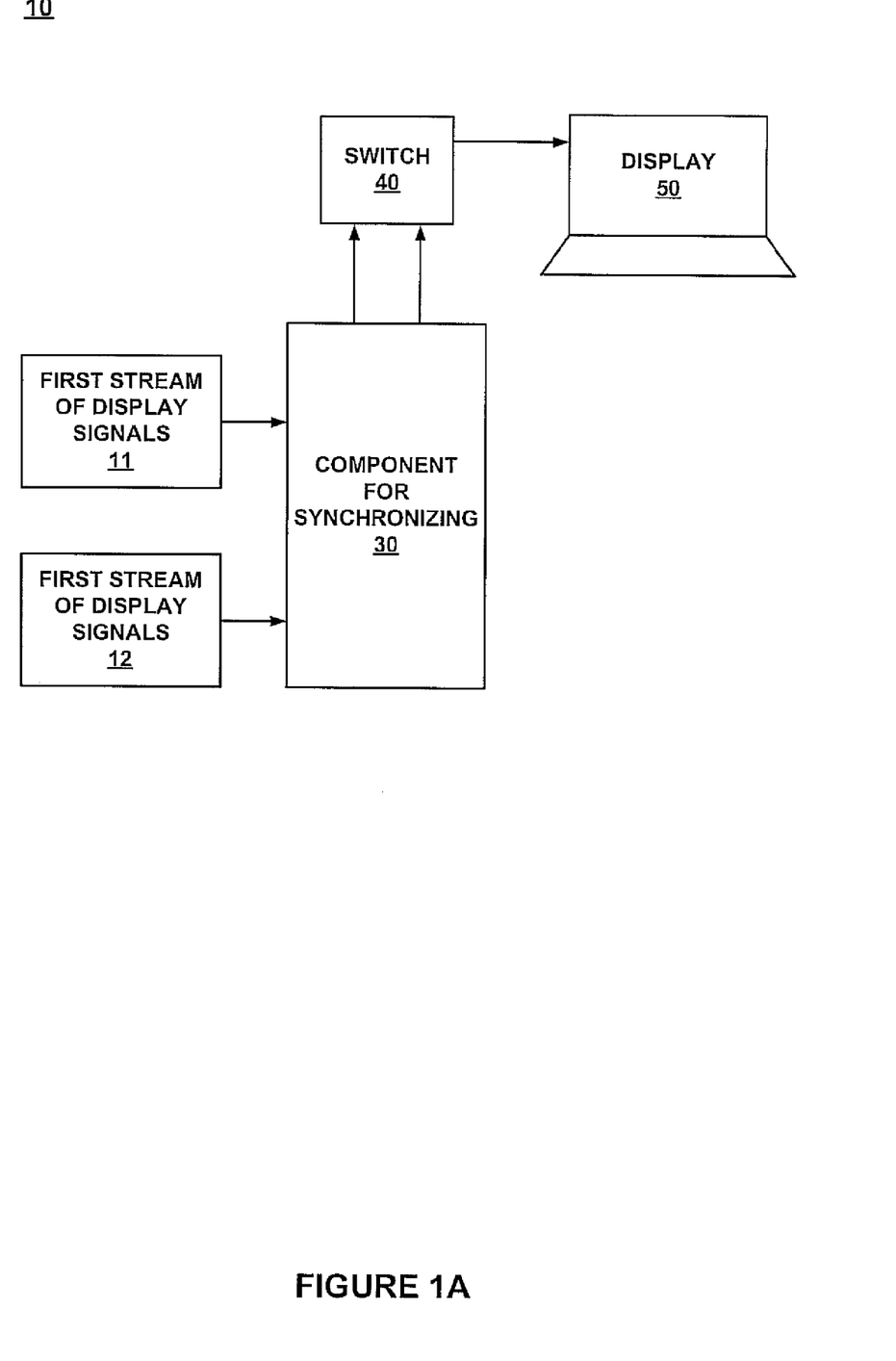
FIG. 1A is a block diagram of an exemplary part of a computer system in accordance with one embodiment of the present invention.

FIG. 1A is a block diagram of exemplary computer system 10 in accordance with one embodiment of the present invention. Computer system 10 includes first stream of display signals 11, second stream of display signals 12, synchronizing component 30, switching component 40, and display 50. First stream of display signals 11 and second stream of display signals 12 are communicatively coupled to synchronizing component 30 and switching component 40 which is communicatively coupled to display 50.

The components of exemplary computer system 10 cooperatively operate to synchronize a first stream of display information with a second stream of display information during a switch between the streams of display information. Synchronizing component 30 adjusts transmission timing of display component information from the first stream of display signals 11 and/or the second stream of display signals 12 within a synchronization tolerance. In one embodiment, the synchronization tolerance (e.g., within the vertical blanking period of a display, etc.) is one that permits a transition between the graphics streams without introducing artifacts or glitches. Switching component 40 switches communication of signals to display 50 between the first stream of display signals and the second stream of display signals.

It is appreciated that a variety of techniques are available for synchronizing component 30 to synchronize the signals from the plurality of processors. In one embodiment, synchronizing component 30 introduces timing adjustments to the signals. For example, synchronizing component 30 can introduce an adjustment to the duration of a timing factor (e.g., a vertical blanking interval, horizontal blanking interval, etc.) in one and/or both of the signals so that graphics information or a display characteristic is in within synchronization tolerance or concurrence in time. In one exemplary implementation, adjusting the timing of the signals from the graphics processing units creates a sliding timing window in which alignment of signals from multiple graphics processing units can be realized allowing the transition between the graphics processing units to be completed when the output of the two graphics processing units are aligned. It is appreciated that embodiments can be readily adapted to implement a variety of adjustments (e.g., a delay, increase, quicken, shorten, stall, etc.) to a time duration between the occurrence of various display characteristics (e.g. a frame based characteristic, a line based characteristic, various interrupts, a refresh indication, etc.). It is also appreciated that the timing adjustments can be made over multiple characteristics (e.g., over multiple frames, multiple lines, etc.) and can be incremental adjustments. For example, the amount of adjustment in one frame or line duration can be relatively large (e.g., when relatively far out of sync, etc.) compared to the amount of adjustment in another frame or line duration (e.g., when relatively close to sync, etc.).

It is also appreciated a variety of mechanisms can be utilized to facilitate introduction of the timing adjustment. In one embodiment, NVIDIA Display Power Management Saving (NVDPS) is utilized to facilitate timing adjustments. In one exemplary implementation, adjustment of the horizontal blanking interval is made to effect a lower overall timing base (and refresh rate) without requiring the dot clock and other timing parameters to be completely reprogrammed.

Figure 1B:
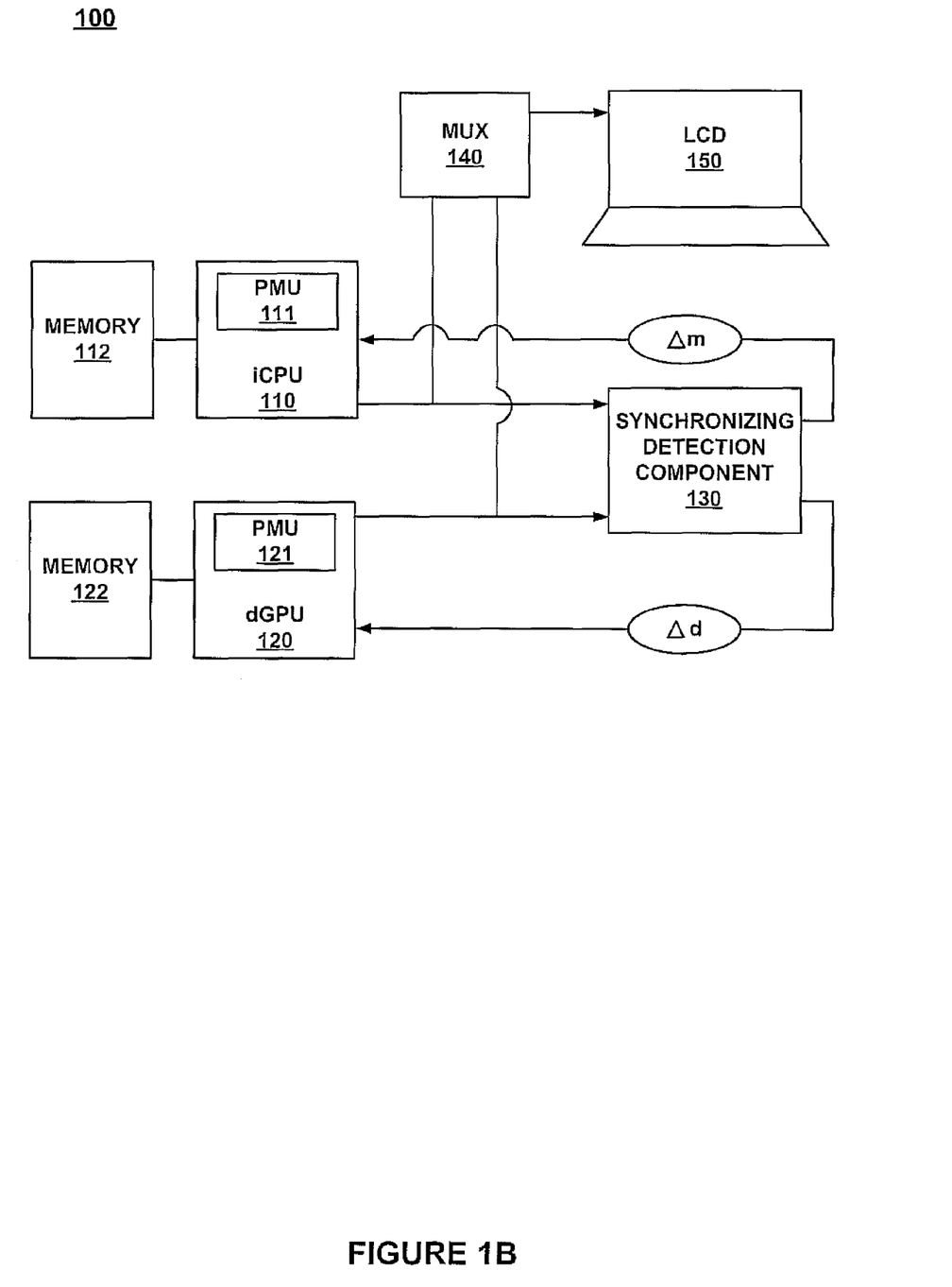
FIG. 1B is a block diagram of another exemplary computer system in accordance with one embodiment of the present invention.

FIG. 1B is block diagram of exemplary computer system 100 in accordance with one embodiment of the present invention. Computer system 100 includes integrated graphics processing unit 110 (iGPU), memory 112, discrete graphics processing unit (dGPU) 120, memory 122, synchronizing detection component 130, switching component 140, and liquid crystal display (LCD) 150. Graphics processing unit 110 (iGPU) and discrete graphics processing unit (dGPU) 120 are communicatively coupled to synchronizing detection component 130 and switching component 140 which is communicatively coupled to liquid crystal display (LCD) 150. Graphics processing unit 110 (iGPU) and discrete graphics processing unit (dGPU) 120 are communicatively coupled to memory 112 and memory 122.

The components of exemplary computer system 100 cooperatively operate to arbitrate control of a display between two graphics controllers. First graphics processing unit iGPU 110 processes graphics information. Second graphics processing unit dGPU 120 processes graphics information. Memory 112 and memory 122 store information, including data and instructions for use by first graphics processing unit iGPU 110 and second graphics processing unit dGPU 120. It is appreciated memory 112 and 122 can include a variety of configurations. For example, memory 112 and memory 122 can be a single memory or plurality of memories, can include random access memory, hard drive media, removable media, flash memory, compact disk, etc. Synchronizing detection component 130 detects synchronization differences in the transmission of display component information from the first graphics processing unit iGPU 110 and the second graphics processing unit dGPU 120. Switching component 140 controls switching between synchronized transmission of display component information from the iGPU 110 and the dGPU 120. Switching component 140 forwards display component signals from the first graphics processing unit and the second graphics processing unit in accordance with a graphics processing unit selection indication. In one embodiment, switching component 140 is a multiplexer. LCD 150 displays presentations (e.g., text, video, graphics, etc.). It is appreciated the display can have a variety of configurations (e.g., integrated, external, etc.).

In one embodiment, synchronizing detection component 130 detects the timing difference between the two graphics processing unit output signals from the graphics processing units. In one embodiment, the synchronizing detection component 130 detects an indication of a corresponding video or display characteristic (e.g., a display synchronization pulse, a horizontal blank interrupt, a vertical blank interrupt, interrupt associated with a refresh, etc.) from multiple graphics processors. The detection of indications of corresponding video or display characteristics are utilized to determine the timing difference between the outputs from the graphics processing units. In one embodiment, the detection of corresponding video or display characteristics occurrences are forwarded for utilization in determining the timing difference between the outputs from the graphics processing units. In one exemplary implementation the detection of the corresponding video or display characteristic occurrences (e.g., blanking interrupts, sync pulses, etc.) are forwarded for utilization by a microcontroller in determining the timing difference between the outputs from the graphics processing units.

In one embodiment, the iGPU 110 includes a microcontroller PMU 111 and the dGPU 120 includes microcontroller PMU 121 that run software and/or firmware that directs adjustments to the timing of a GPU output. In one embodiment, the microcontrollers are on chip and run independently. In one embodiment, a GPU can include a state machine that takes the information and directs adjustments to the timing of a GPU output. In one embodiment, the microcontroller receives the notification of the indications and directs storage of absolute times associated with the occurrence of the respective corresponding video or display characteristics. The microcontroller also determines the timing difference or delta between occurrence of the respective corresponding video or display characteristics. In one exemplary implementation, the microcontroller determines the timing difference or delta between occurrence of the respective corresponding video or display characteristics by subtracting the absolute time associated with the occurrence of a video or display characteristic in the signals from a first graphics processor from the absolute time associated with an occurrence of a corresponding video or display characteristic in the signals from a second graphics processor. In one embodiment the microcontroller operates in accordance with software instructions stored on a computer readable medium.

In one embodiment, the timing difference or delta between occurrences of the respective corresponding video or display characteristics is determined by the synchronizing component 130. In one exemplary implementation, the difference is determined by counting using pixel clocks as a time base and counts the pixel clock pluses. In one exemplary implementation, the count is provided back to a component (e.g. PMU 111, PMU 121, etc.) as a delta between the two signals. The timing difference or delta between occurrences of the respective corresponding video or display characteristics is utilized in determining an adjustment to the stream of display signals. For example, the delta or timing difference information is forwarded to a PMU and software and/or firmware running on the PMU can direct how much timing adjustment (e.g., delay, etc.) to introduce based upon the received delta or count. In one embodiment, the PMU and synchronizing detection component 130 form a synchronizing component (e.g., synchronizing component 30, etc.)

Figure 2:
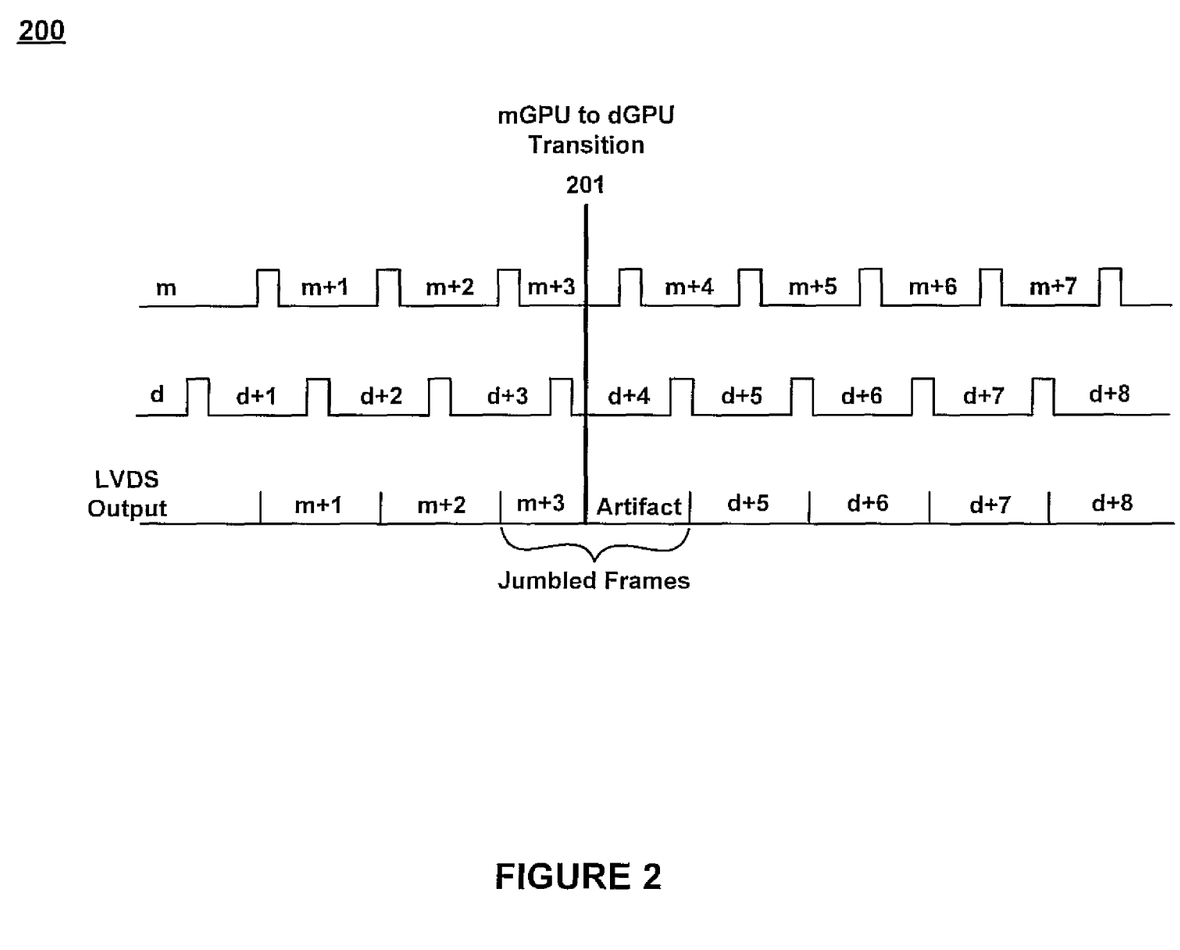
FIG. 2 is an exemplary timing diagram of control signals that are out of sync.

FIG. 2 is an exemplary timing diagram 200 of control signals that are out of sync. The timing diagram 200 includes information that is processed in mGPU and dGPU and fed out as signals m and d. The signals include corresponding graphics information that is out of sync. For example, corresponding first frame m+1 from mGPU and first frame d+1 from dGPU have the same graphic information but are not aligned in time. The same is true for m+1, m+2, m+3, etc. and d+1, d+2, d+3, etc. respectively. If a change is made from mGPU to the dGPU and the out of sync signals are fed onto the display device at the time 201 of the transition in the middle of frame m+3 and d+4 artifacts occur because the portion of frame m+3 and D+4 after 201 are jumbled as an artifact as indicated in the LVDS output.

Conventional attempts at dealing with the artifacts are often very complicated. Conventional LVDS systems do not typically have a readily adaptable gen lock feature where controllers arrive at synchronized timing by sharing sync pulses in which one slaves off the other controller pixel clock. While synchronizing the outputs of multiple graphics processors may be accomplished utilizing a "Gen-Lock" technique that detects a sync signal and alters the timing generators to match, attempting to implement such a gen lock feature in a LVDS system can be very complex. Reprogramming timing generators (e.g., dot clock, PLL, etc.) can be an exhaustive effort involving significant overhead and glitches.

Figure 3:
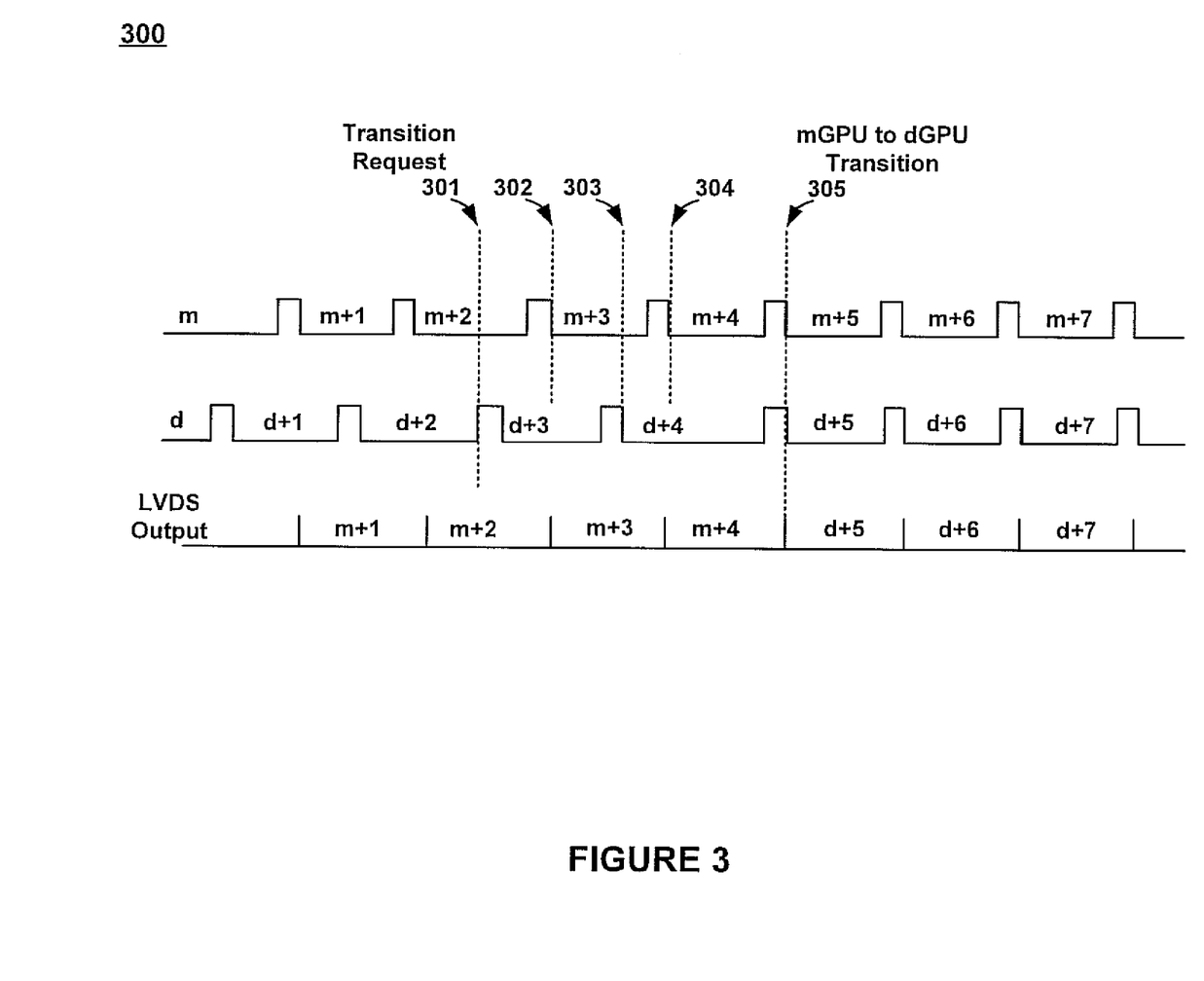
FIG. 3 is an exemplary timing diagram of control signals that are brought into sync in accordance with one embodiment of the present invention.

FIG. 3 is an exemplary timing diagram 300 of control signals that are brought into synchronization in accordance with one embodiment of the present invention. The timing diagram 300 includes information that is processed in mGPU and dGPU and fed out as signals m and d. The signals include corresponding graphics information, for example frames m+1, m+2, m+3, etc. have graphic information that corresponds to frames d+1, d+2, d+3, etc. respectively. Initially the LVDS output to the display corresponds to the m output (e.g., from iGPU 110). At time 310 a transition request is initiated to transition between graphics processors (e.g., iGPU 110 to dGPU 120). Synchronizing component 130 determines the m+3 frame in signal m is out of sync with the d+3 frame in signal d and introduces a timing adjustment (e.g., delay, etc.) to the d+3 frame. At time 303 the synchronizing component 130 determines the m+4 frame in signal m and the d+4 frame in signal d are still out of sync and introduces another timing adjustment (e.g., delay, etc.) to the d+4 frame. At time 305 the synchronizing component 130 determines the m+5 frame in signal m and the d+5 frame in signal d are in sync and permits the transition from m output from iGPU to d output from dGPU to be utilized as LVDS output.

While exemplary timing diagram 300 indicates the m and d signals are in sync after time 305 for frames m+5, m+6 and m+7, it is appreciated the iGPU and dGPU can operate independently and the m and d signals can become out sync after the transition at time 305. If the signals do become out of sync and a transition request back to the iGPU is received a similar synchronization of introducing timing adjustments can be implemented to get the signals m and d back in sync for the transition.

With reference back to FIG. 1, it is appreciated computer system 100 can be implemented in a variety of configurations. Integrated graphics processing unit 110 (iGPU) can be integrated in a variety of processing components. In one embodiment integrated graphics processing unit 110 (iGPU) is integrated in a central processing unit (CPU). In one embodiment, a computer system includes a chip set with components (e.g. north bridge, south bridge, etc.) for facilitating communication of information within the system and a variety of peripheral devices (e.g. keyboard, mouse, hard drive, removable data storage device, communication port, etc.) It is also appreciated the component for controlling switching between the first graphics processing unit and the second graphics processing unit can be implemented in a variety of ways.

Figure 4:
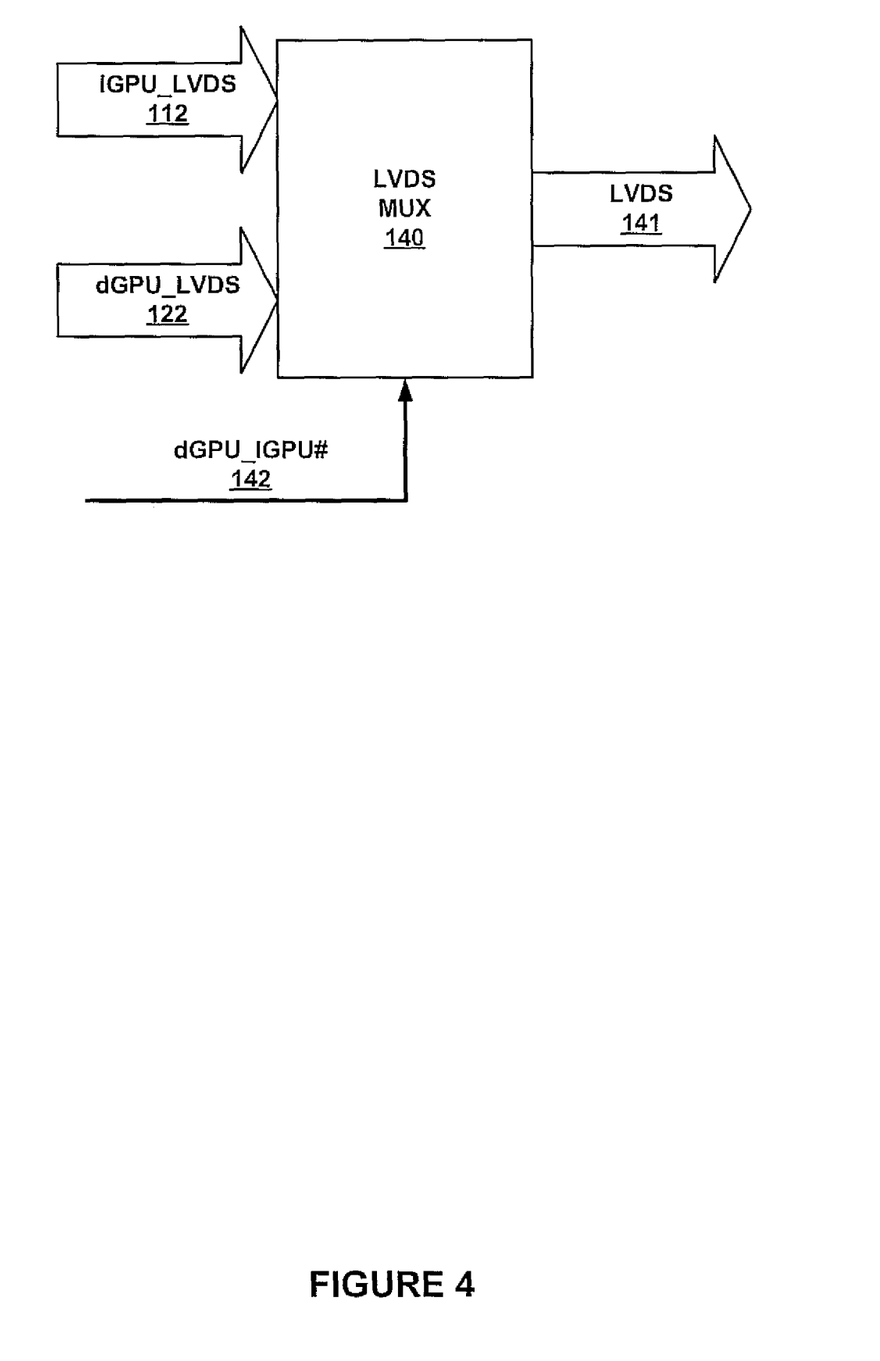
FIG. 4 is a block diagram of one exemplary implementation of a MUX for controlling switching between the first graphics processing unit and the second graphics processing unit in accordance with one embodiment of the present invention.

FIG. 4 is a block diagram of one exemplary implementation of MUX 140 for controlling switching between the first graphics processing unit and the second graphics processing unit. MUX 140 receives graphics signals from iGPU (e.g., iGPU_LVDS 112, etc.) and dGPU (e.g., dGPU_LVDS 122, etc.) and forwards one set of graphics signals (e.g., LVDS 141, etc.) to a panel (e.g., LCD 150) in accordance with selection indication (e.g., DGPU_IGPU#142). In the illustrated example the graphics signals include low voltage differential signals (LVDS). It is appreciated that present invention is readily implemented with graphics signals for other types or displays (e.g., CRT, etc.).

Figure 5:
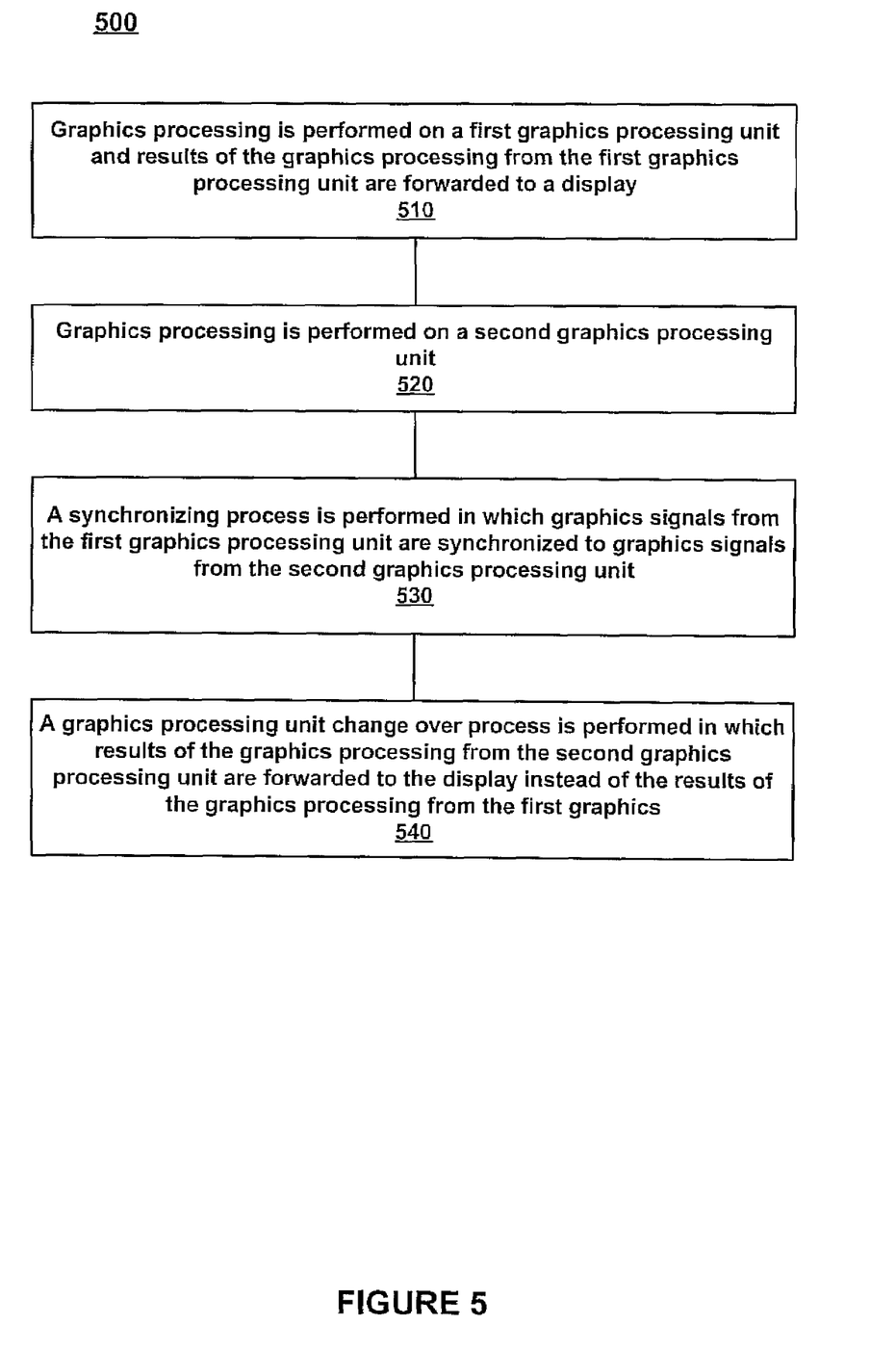
FIG. 5 is a block diagram of an exemplary multiple graphics processing method in accordance with one embodiment of the present invention.

FIG. 5 is a block diagram of exemplary multiple graphics processing method 500 in accordance with one embodiment of the present invention. Multiple graphics processing method 500 facilitates efficient and effective transition of a video stream feed from a first graphics processing unit to a second graphics processing unit. In one embodiment the first graphics processing unit is an internal graphics processing unit and the second graphics processing unit is a discrete or dedicated graphics processing unit.

In block 510 graphics processing is performed on a first graphics processing unit and results of the graphics processing from the first graphics processing unit are forwarded to a display.

In block 520 graphics processing is performed on a second graphics processing unit.

A synchronizing process is performed in block 530 in which graphics signals from the first graphics processing unit are synchronized within acceptable tolerance to graphics signals from the second graphics processing unit. In one embodiment, the synchronization includes adjusting a duration between the occurrences of a display characteristics in at least one of said graphics signals. In one exemplary implementation, a duration of a timing factor (e.g., a blanking interval, etc.) is adjusted in at least one of the graphics signals.

At block 540 a graphics processing unit change over process is performed in which results of the graphics processing from the second graphics processing unit are forwarded to the display instead of the results of the graphics processing from the first graphics.

Figure 6:
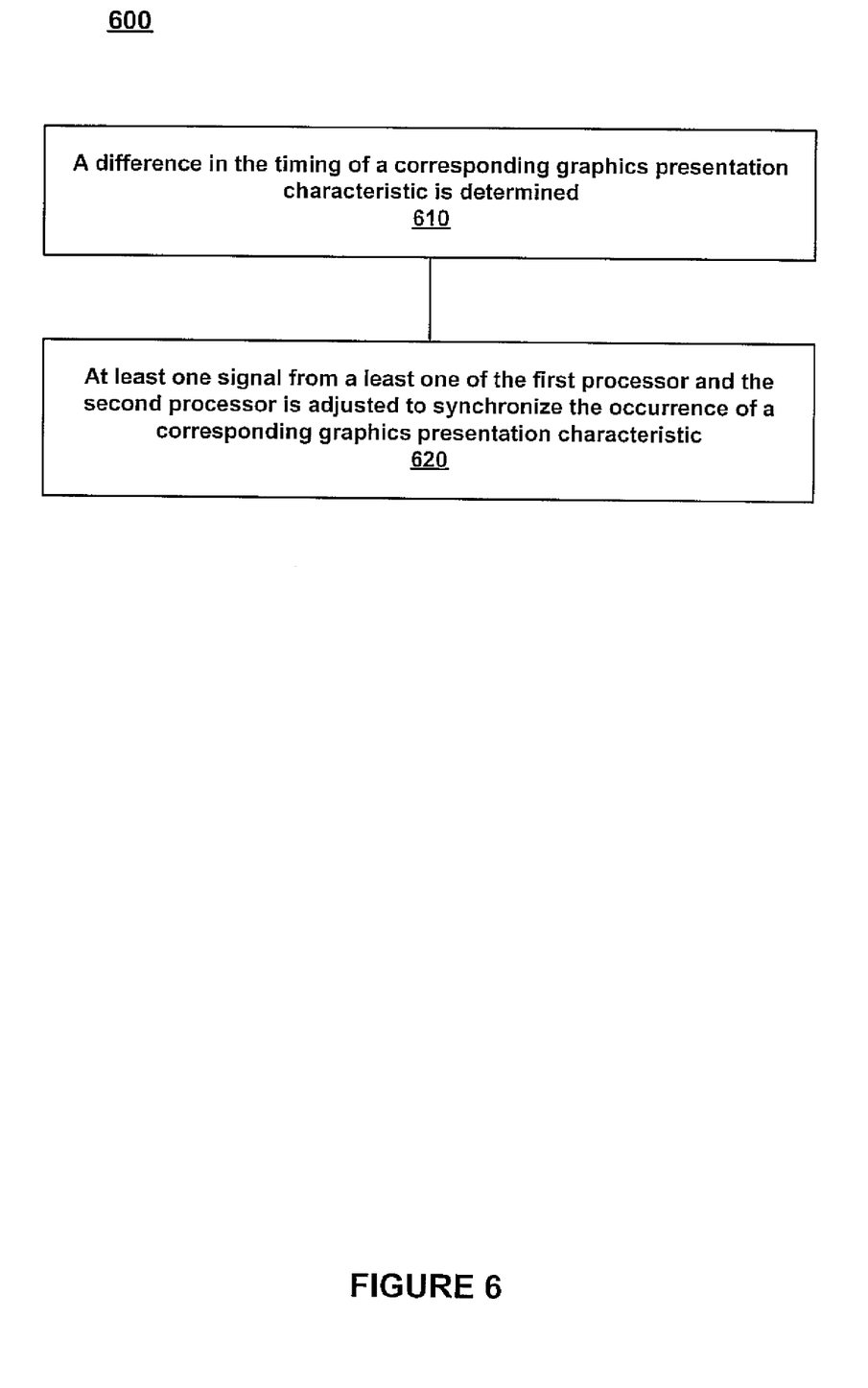
FIG. 6 is a flow chart of an exemplary synchronizing process in accordance with one embodiment of the present invention.

FIG. 6 is a flow chart of exemplary synchronizing process 600 in accordance with one embodiment of the present invention.

In block 610, a difference in the timing of a corresponding graphics presentation characteristic is determined. In one embodiment, a timing difference is determined between a corresponding graphics presentation characteristic of the graphics information processed on the first processor and graphics information processed on the second processor. In one exemplary implementation the timing occurrence of the corresponding graphics presentation characteristics is determined by a hardware component and the information forwarded to another component which utilizes software and/or firmware to direct determination of a delta between the occurrence timings and a corresponding adjustment to the signals. In another exemplary implementation timing differences are determined by hardware (e.g., a counter, etc.) and the delta information is forwarded to another component which utilizes software and/or firmware to direct a corresponding adjustment to the signals.

In block 620, at least one signal from at least one of the first processor and the second processor is adjusted to synchronize the occurrence of a corresponding graphics presentation characteristic. In one embodiment, signals are adjusted to reduce the timing difference between the corresponding graphics presentation characteristic. It is appreciated the corresponding graphics presentation characteristic can include a variety of characteristics. For example the characteristics can include a frame blanking interval, line blanking interval, etc. It is also appreciated a variety of adjustments can be made. For example, the adjustments can include delaying or speeding up the occurrence or duration of one or more blanking intervals (e.g., a frame blanking interval, vertical blanking interval, a line blanking interval, a horizontal blanking interval, etc.). In one exemplary implementation the adjusting signals can include shortening and/or extending the occurrence or duration of a blanking interval.

Figure 7:
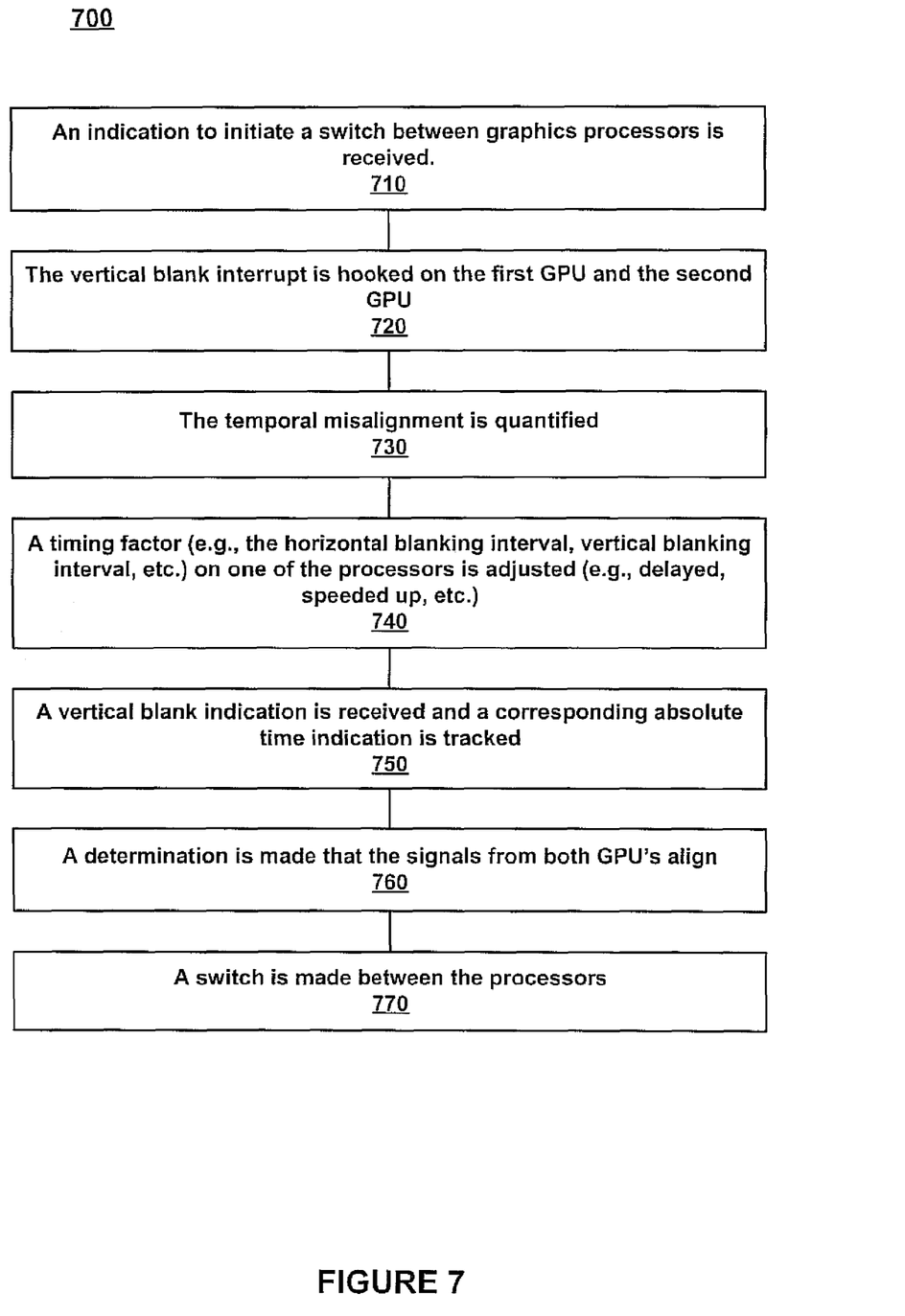
FIG. 7 is a flow chart of another exemplary graphics processor switch method in accordance with one embodiment of the present invention.

FIG. 7 is a flow chart of exemplary synchronizing process 700 in accordance with one embodiment of the present invention.

In block 710 an indication to initiate a switch between graphics processors is received. In one embodiment the indication to initiate a switch between graphics processors is a request to complete a hybrid transition. In one exemplary implementation, the indication also initiates a power up of the second processor if the second processor is not already powered on. For example, the second GPU LVDS display output is enabled (even though not yet forwarded to the display).

In block 720, the vertical blank interrupt is hooked on the first GPU and second GPU.

In block 730, the temporal misalignment is quantified. In one embodiment, the temporal misalignment is quantified prior to making any adjustments. In one exemplary implementation an estimate on how much the timing of the second GPU needs to be altered may be generated and used to determine how much the timing is adjusted in order to quickly achieve synchronization within an acceptable range (e.g., a blanking time, etc.).

In block 740 a timing factor (e.g., the horizontal blanking interval, vertical blanking interval, etc.) on one of the processors is adjusted (e.g., delayed, speeded up, etc.). In one embodiment, adjustment of the timing factor impacts (e.g., slows down, etc.) the overall display rate.

In block 750 a vertical blank indication is received and a corresponding absolute time indication is tracked. In one embodiment, software receives an indication of a vertical blank interrupt and directs retrieval and storage of a corresponding absolute time (e.g., from GPU clock, process clock, system timer, etc.). The difference between absolute times is utilized to determine or quantify the temporal misalignment between the vertical blank interrupts.

In block 760 a determination is a made that the signals from both GPU's align. In one embodiment, the vertical blank interrupts occur at the approximately the same time (e.g. remaining misalignment falls within an acceptable range so the vertical syncs are roughly in the same time). In one exemplary implementation, the horizontal blank extensions are reduced enough to allow horizontal sync alignment to be subsequently achieved using a similar process. In one exemplary implementation, timings are restored so that the second GPU does not necessarily match the first.

In block 770, a switch is made between the processors. In one embodiment a MUX is switched completing the transition of LVDS ownership. In one exemplary implementation, the transition to the second GPU is completed during the vertical blanking interval so as to further reduce artifacts.

It is appreciated that present invention systems and methods can include a variety of implementations. For example, present invention systems and methods or processes can include adjustment to a variety of intervals (e.g., a frame blanking interval, vertical blanking interval, a line blanking interval, a horizontal blanking interval, etc.). It is also appreciated that embodiments of the present invention can be implemented in a variety of configurations including hardware, software, firmware and combinations thereof. For example, a computer readable medium (e.g., memory communicatively coupled to system 10, 100, etc.) with instructions embedded therein can be utilized for directing components (e.g., processors in system 10, 100, etc) participating in present systems, methods or processes (e.g., 500, 600, 700, etc).

In one exemplary implementation, both GPU's start at approximately 62 HZ or a 16 mS vertical sync interval. If initially the second GPU's VBI occurs 8 ms after the first GPU, the second GPU's timings are increased to create a vertical interval of 24 mS (e.g., 16+8) or approximately 41.67 Hz. Then on the next vertical blank the two signals should align. If the misalignment exceeds the timing adjustment ability, a smaller adjustment may be utilized so as to achieve alignment after two or more vertical blanks. Additionally, a smaller alignment may be used (e.g., 23.9 ms) so that as the vertical blank interrupts occur very close, the timing can be further adjusted to optimally bring the Horizontal timings in sync. In one embodiment, the time taken to align the displays is dependent on the amount with which the timing can be accurately aligned and Operating System overhead that may delay processing of the vertical blank interrupts.

In one embodiment, hardware is utilized to detect alignment by electrically monitoring the dGPU and mGPU outputs directly. In this situation the delta D or delta M signal may be produced depending on the direction of the transition. An agent in the GPU such as a microcontroller (e.g., PMU) can respond to the signal and perform the timing adjustment steps described above without the need for driver or operations system control.

It is appreciated that the present change over systems and methods enable each processor to operate independently when not transitioning. In addition, by synchronizing the signals, the present approach facilitates reduction of possible panel control signal excursion, panel failure and possible damage associated with undeterministic timing in signals associated with the transition from one processor to another. For example, during a transition interval the time taken to otherwise re-apply valid timings on the panel interface is affected by driver software response time which is affected by operating system response time and other activities on the system, without the present invention timing could be undeterministic. Operating systems are often not real time, and do not typically have guaranteed latency. Without the present invention, adverse impacts could occur if a system becomes busy right at the middle of the transition exceeding the maximum allowed interval set forth the panel specification.

In one embodiment, precise coordinated control of internal sequencing on both the integrated and discrete graphics processing units is available and the LCD power enable is kept applied while the LVDS signals are modulated. In one exemplary implementation, the mode on the other GPU is set prior to transition as set forth above.

Thus, the present invention facilitates efficient and effective utilization of multiple processors with a display. Each process can start LVDS frame timings at a random point in time and the present processor change over approach facilitates synchronization of the LVDS signals and avoidance of artifacts on the panel. For example, artifacts associated with several frames that could otherwise pass before the panel controller re-syncs to the alternate processor's timing. In addition, main timing characteristics (e.g., dot clock, phase lock loops, etc.) do not need to be disturbed and conventional power panel sequencing is not needed for transitions between the processors.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

What is claimed is:

1. A graphics processing system comprising: a hardware component for transmitting display component information; a component for adjusting transmission timing of display component information from a first stream of display signals and a second stream of display signals within a synchronization tolerance, wherein said adjusting includes an adjustment to a duration of a timing factor included in a transmission signal of said display component information; wherein a first pixel source provides said first stream of display signals and a second pixel source provides said second stream of display signals, and wherein said transmission timing adjustment comprises: a simulation of a generator locking (genlock) function that is performed independently in relation to a genlock hardware component; and at least one of: sliding a timing alignment of said first pixel source to match a timing alignment of said second pixel source; or sliding said timing alignment of said second pixel source to match said timing alignment of said first pixel source; and a component for switching between said first stream of display signals and said second stream of display signals upon said performance of said transmission timing adjustment; and wherein upon said switching, an independent timing of said first pixel source and said second pixel source is restored.

2. A graphics processing system of claim 1 further comprising:
   a first graphics processing unit for processing graphics information and outputting said first stream of display signals, and
   a second graphics processing unit for processing said graphics information and outputting said second stream of display signals.

3. A graphics processing system of claim 2 wherein said component for adjusting transmission of display component information determines a timing difference between a corresponding characteristic of said first stream of display signals and said graphics information.

4. A graphics processing system of claim 3 wherein said timing difference between said corresponding graphics presentation characteristic of said graphics information is a timing difference between corresponding frames of a graphics image.

5. A graphics processing system of claim 3 wherein said timing difference between said corresponding graphics presentation characteristic of said graphics information is a timing difference between corresponding lines of a graphics image.

6. A graphics processing system of claim 2 wherein said component for synchronizing introduces a delay in signals from one of said first graphics processor or said second graphics processor.

7. A graphics processing system of claim 2 wherein said first graphics processing unit is an internal graphics processing unit and said second graphics processing unit is a discrete graphics processing unit.

8. A graphics processing system of claim 1 wherein said component for controlling switching comprises a multiplexer that forwards said first stream of display signals or said second stream of display signals in accordance with a graphics processing unit selection indication.

9. A graphics processing system of claim 1 wherein said component for switching participates in a graphics processing unit change over process comprising changing driving of said first stream of display signals from a first graphics processor to said second stream of display signals from a second graphics processor during a vertical blanking period.

10. A graphics processing method comprising:
    performing graphics processing on a first graphics processing unit;
    forwarding results of said graphics processing from said first graphics processing unit to a display;
    performing graphics processing on a second graphics processing unit;
    performing a synchronizing process in which graphics signals from said first graphics processing unit are synchronized to graphics signals from said second graphics processing unit, wherein said synchronizing includes adjusting a time duration between the occurrence of a display characteristic in at least one of said graphics signals;
    wherein said synchronizing process comprises simulating a generator locking (genlock) function, which is performed independently in relation to a genlock hardware component, wherein said synchronizing process slides a timing alignment of said first graphics processing unit to match a timing alignment of said second graphics processing unit or vice versa; and
    performing a graphics processing unit change over process in which results of said graphics processing from said second graphics processing unit are forwarded to said display instead of said results of said graphics processing from said first graphic processing unit;
    wherein upon performance of said graphics processor unit change over process, an independent timing of said first graphics processing unit and an independent timing of said second graphics processing unit are restored.

11. A graphics processing method of claim 10 wherein said first graphics processing unit is an internal graphics processing unit and said second graphics processing unit is a discrete graphics processing unit.

12. A graphics processing method of claim 10 wherein said synchronizing process comprises:
    determining a timing difference between a corresponding graphics presentation characteristic of said graphics information processed on said first processor and graphics information processed on said second processor; and
    adjusting signals from at least one of said first processor and said second processor to reduce said timing difference between said corresponding graphics presentation characteristic.

13. A graphics processing unit change over process of claim 10 wherein said adjusting signals includes delaying the occurrence or duration of a blanking interval.

14. A graphics processing unit change over process of claim 10 wherein said adjusting signals includes shortening the occurrence of a blanking interval.

15. A programmable non-transitory computer readable storage medium comprising instructions that are tangibly embedded therein for directing a synchronized graphics processing unit change-over process, wherein the graphics processing unit change-over process comprises the steps of:
receiving an indication of timing of a corresponding graphics presentation characteristic of said graphics information processed on a first processor and graphics information processed on a second processor;
determining a difference in said timing of a corresponding graphics presentation characteristic; and
adjusting a duration of at least one of said corresponding graphics presentation characteristics in at least one signal from at least one of said first processor and said second processor to synchronize said occurrence of said corresponding graphics presentation characteristic;
wherein said adjusting a duration comprises simulating a generator locking (genlock) function, which is performed independently in relation to a genlock hardware component, wherein said adjusting slides a timing alignment of said first processor unit to match a timing alignment of said second processor or vice versa; and
wherein upon said synchronization, an independent timing of said first pixel source and said second pixel source is restored.

16. A computer readable medium of claim 15 wherein said corresponding graphics presentation characteristic is a frame blanking interval.

17. A computer readable medium of claim 15 wherein said corresponding graphics presentation characteristic is a line blanking interval.

18. A computer readable medium of claim 15 wherein said adjusting includes adjusting a duration of a blanking interval.

19. A computer readable medium of claim 15 wherein said adjusting includes adjusting an occurrence of a frame blanking interval.

20. A computer readable medium of claim 15 wherein said adjusting includes adjustments to a duration of a vertical blanking period, horizontal blanking period or both.

* * * * *